US006734788B1

United States Patent
Winner

(10) Patent No.: US 6,734,788 B1
(45) Date of Patent: May 11, 2004

(54) VEHICLE ANTI-THEFT SYSTEM WITH TAMPERING INDICATOR

(75) Inventor: Kevin D. Winner, Hermitage, PA (US)

(73) Assignee: Winner International Royalty LLC, Sharon, PA (US)

( * ) Notice: Subject to any disclaimer, the term of this patent is extended or adjusted under 35 U.S.C. 154(b) by 892 days.

(21) Appl. No.: 08/863,345

(22) Filed: May 27, 1997

(51) Int. Cl.[7] ................................................ B60R 25/10
(52) U.S. Cl. .............................. 340/426.1; 340/426.31; 340/426.12; 340/425.5; 340/321; 340/322; 180/287; 70/209
(58) Field of Search ............................... 340/425.5, 426, 340/429, 430, 438, 527, 528, 541, 566, 321, 322, 426.31; 70/209, 226, 211, 212, 225, 237, 238, 239; 180/287

(56) References Cited

U.S. PATENT DOCUMENTS

| 4,738,127 A | 4/1988 | Johnson |
| 4,935,047 A | 6/1990 | Wu |
| 4,961,331 A | 10/1990 | Winner |
| 5,055,823 A | 10/1991 | Fuller |
| 5,128,649 A | 7/1992 | Elmer |
| 5,157,375 A | * 10/1992 | Drori .......................... 340/429 |
| 5,365,215 A | 11/1994 | Carlo et al. |
| 5,398,017 A | * 3/1995 | Chen .......................... 340/426 |
| 5,598,725 A | * 2/1997 | Chang .......................... 70/209 |

FOREIGN PATENT DOCUMENTS

DE  32 41 705 A1  11/1982

\* cited by examiner

*Primary Examiner*—Daryl Pope
(74) *Attorney, Agent, or Firm*—Fay, Sharpe, Fagan, Minnich & McKee

(57) ABSTRACT

An electrical anti-theft device for a motor vehicle issues an audible alarm signal for a predetermined period of time in response to tampering with the vehicle which is sensed by the anti-theft device. At the end of the predetermined period of time, a strobe light is activated and operates continuously thereafter to indicate that the vehicle has been tampered with. At the same time, the electrical anti-theft device is reset so as to issue the alarm signal in response to further tampering with the vehicle. The electrical anti-theft device is incorporated in a mechanical anti-theft device mountable on a vehicle steering wheel to limit rotation thereof.

31 Claims, 3 Drawing Sheets

VEHICLE ANTI-THEFT SYSTEM WITH TAMPERING INDICATOR

BACKGROUND OF THE INVENTION

The present invention relates to the art of vehicle anti-theft systems and devices and, more particularly, to a system and/or device which produces an alarm signal for a period of time following tampering with a vehicle and provides a signal by which the vehicle owner is apprised of the tampering.

It is of course well known to provide motor vehicles with anti-theft systems which are built into the electrical circuitry of the vehicle and operable through the vehicle battery to issue a visible and/or audible alarm in response to tampering with the vehicle. Such tampering may, for example, be the efforts of a would be thief to gain access to the interior, trunk and/or motor compartment of the vehicle and causing vehicle motion and/or vibration by which the audible and/or visible alarm signal is caused to be generated. It is likewise well known to provide such anti-theft devices in the form of a portable housing adapted, for example, to sit on the vehicle dash board and to be powered either by an internal battery or by connection to the vehicle battery through the cigarette lighter receptacle. Still further, it is known to provide vehicle anti-theft devices which are mechanically operable to restrain rotation of a vehicle steering wheel, such devices being shown for example in U.S. Pat. No. 4,738,127 to Johnson, U.S. Pat. No. 4,935,047 to Wu and U.S. Pat. No. 4,961,331 to Winner, all of which patents are assigned to the assignee of the present invention and the disclosures of which are incorporated by reference herein for background information. The latter devices include a pair of attachment components in the form of hooks which are adapted to be relatively displaced between mounted and storage positions for the device. In use of the Johnson and Wu devices, the hooks engage diametrically opposed portions of a vehicle steering wheel rim and the device includes an arm extending radially outwardly of the rim to limit rotation of the steering wheel by engagement of the arm with the interior of the vehicle. In use of the Winner device, the hooks respectively engage the steering wheel and a foot pedal lever on the floor of the vehicle, whereby both rotation of the steering wheel and depression of the foot pedal are restrained to preclude unauthorized operation of the vehicle. In each device, a key operated lock mechanism is provided to preclude removal of the attachment from the steering wheel other than by the owner or authorized operator of the vehicle.

Vehicle owners are encouraged to use such electrically operated and mechanically operated anti-theft devices or systems in combination to optimize the protection against vehicle theft. In fact, mechanical devices for mounting on a vehicle steering wheel to limit rotation of the latter have been provided heretofore with audible alarms actuated in response to steering wheel movement or vibration caused by an unauthorized entry or attempted entry of the vehicle. Devices of the latter character are shown, for example, in U.S. Pat. No. 5,055,823 to Fuller and U.S. Pat. No. 5,128,649 to Elmer, and the alarm devices therein are powered either by an internal battery or by connection to the vehicle battery through the cigarette lighter receptacle. In the Fuller device, the alarm is both audible and visible and, when activated, operates for a predetermined period of time following which the system is reset. In the Elmer device, the alarm is audible and appears to remain energized when activated until such time as the device is turned off by the vehicle owner or the power of the battery falls below that necessary for operating the alarm.

In connection with the use of anti-theft systems and devices of the foregoing character, a vehicle owner parks his vehicle and, upon exiting the vehicle, arms the system or device, whereby an unauthorized attempt thereafter to break into the vehicle or otherwise tamper therewith activates the alarm. The alarm may, for example, be in the form of a siren, the vehicle lights in a blinking mode and/or the vehicle horn outputting a steady or intermittent sound. As mentioned above, some such devices and systems operate for a predetermined period of time and then are automatically reset. Such operation deters the would be thief and, in resetting, will perform the same function should the thief or another unauthorized person make a further effort to break in or otherwise tamper with the vehicle. Moreover, the resetting feature advantageously prevents the power supply, which can be the vehicle battery, from going dead which not only precludes operation of the anti-theft device or system but, if provided by the vehicle battery, precludes operation of the vehicle when the owner returns thereto. Still further, it is well known that third persons who may be relied upon to report tampering with a vehicle upon hearing an alarm horn or seeing blinking lights have come to ignore the latter when the system is of the character which continues to issue the alarm signal as opposed to resetting. Accordingly, systems which do not reset have the latter disadvantage in addition to the potential for system and/or vehicle inoperability due to battery loss. While an anti-theft device or system which resets is desirable for the reasons set forth hereinabove, if the vehicle is tampered with and the owner returns to the vehicle after the system has reset, the owner is of course not aware of the tampering. This is a potentially dangerous situation in that the would be thief or car-jacker could be waiting nearby so as to accost the vehicle owner upon his or her return to the vehicle for the purpose of robbing the owner and/or hijacking the vehicle.

SUMMARY OF THE INVENTION

In accordance with the present invention, an electrical anti-theft device for a vehicle is provided with an arrangement for warning a vehicle owner or authorized operator returning to his or her vehicle when tampering therewith has taken place. More particularly in accordance with the invention, a vehicle anti-theft device comprises an electrical circuit including an alarm which is preferably audible and which has activated and deactivated modes when the device is armed. When tampering with a vehicle is sensed by a sensor in the electrical circuit, the alarm is activated for a period of time after which the alarm is deactivated. At the same time that the alarm is deactivated, a tamper indicator is activated for indicating to the vehicle owner or authorized operator upon returning to the vehicle that tampering has taken place. Preferably, the tamper indicator is a strobe light which enables the authorized person to be apprised while still at a considerable distance from the vehicle that tampering therewith has taken place. Thus, the authorized operator or vehicle owner is made aware of the potential danger that the person who tampered with the vehicle may still be close by, whereby the authorized person can leave the area, call the police or approach the vehicle with extreme caution to determine whether or not it is safe to reenter the vehicle. The tamper indicator also provides a vehicle owner or authorized operator who may be in an area of a town with which he or she is not familiar with an opportunity to learn whether or not the area is safe for parking and leaving a vehicle. Preferably, when the alarm is deactivated as mentioned above, and the tamper indicator is activated, the anti-theft device is reset so that the audible alarm is again activated should the would be thief or another unauthorized person attempt a second entry or other tampering with the vehicle. Accordingly, the deterrent value of the alarm is maintained and is supplemented by the continued activation of the tamper indicator, especially if the latter is a highly visible and attention attracting signal such as provided by a strobe light.

In accordance with another aspect of the present invention, an electrical vehicle anti-theft device of the foregoing character is incorporated in a mechanical anti-theft device which is mountable in a vehicle to limit rotation of the vehicle steering wheel. Thus, a vehicle anti-theft system is provided which further optimizes protection against theft or-other tampering with a parked vehicle by precluding operation of the vehicle even if the potential thief is so bold as to pursue entry of the vehicle and theft thereof while the alarm is activated. Further, should the vehicle owner for some reason desire to leave the mechanical device unattached to the vehicle steering wheel, he or she can still activate the electronic alarm device to obtain the security provided thereby.

It is accordingly an outstanding object of the present invention to provide an electrical anti-theft device and/or system for a vehicle having the capability of indicating to the owner or authorized operator of a vehicle that the vehicle has been tampered with.

Another object is the provision of a vehicle anti-theft device and/or system of the foregoing character having an alarm which is actuated for a predetermined period of time in response to tampering with the vehicle and wherein a tampering indicator is activated when the alarm is deactivated.

Yet another object is the provision of a vehicle anti-theft device and/or system of the foregoing character wherein the tamper indicator operates continuously once activated and the alarm is reset at the end of the period of activation thereof.

Still a further object is the provision of a vehicle anti-theft system in which an electrical anti-theft device of the foregoing character is incorporated in a mechanical anti-theft device of the type mountable in a vehicle to limit rotation of the vehicle steering wheel.

Yet a further object is the provision of a vehicle anti-theft device and/or system of the foregoing character, which optimizes protection against tampering with or theft of a vehicle.

Another object is the provision of a vehicle anti-theft device and/or system of the foregoing character, which optimizes protection for a vehicle owner or authorized operator against the potential of physical harm and/or commandeering of his or her vehicle upon returning thereto after the vehicle has been tampered with.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
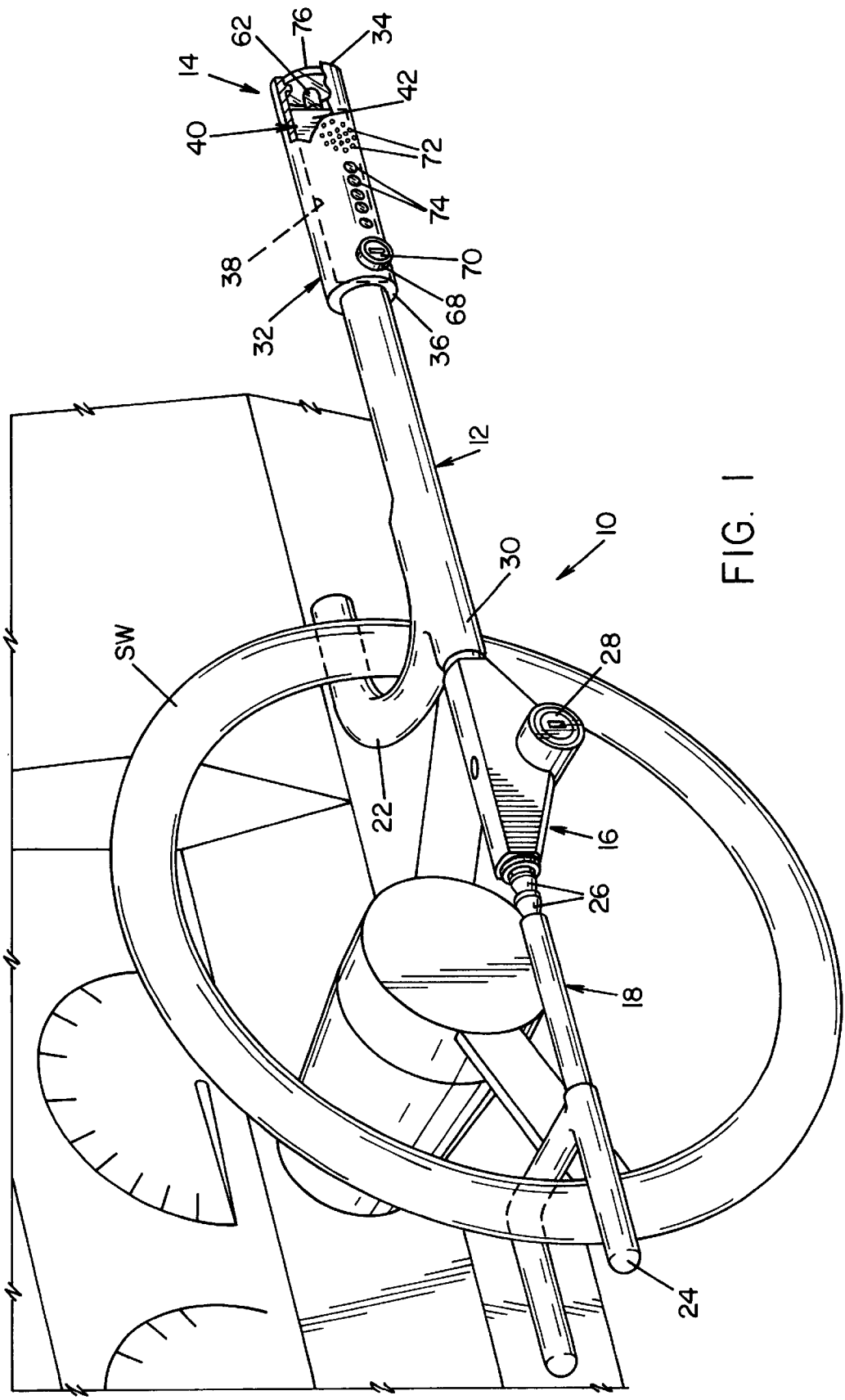
FIG. 1 is a perspective view of a mechanical vehicle anti-theft device adapted to be mounted on a vehicle steering wheel and having an electrical anti-theft device in accordance with the present invention incorporated therein.

Referring now in greater detail to the drawings wherein the showings are for the purpose of illustrating a preferred embodiment of the invention only and not for limiting the invention, FIG. 1 illustrates a vehicle anti-theft steering wheel lock 10 of the type illustrated in the aforementioned patents to Johnson and Wu, whereby a detailed description of the structure and operation thereof will not be necessary. Briefly, and as disclosed in the latter patents, anti-theft device 10 includes an elongated tubular housing 12 having an outer end 14 and inner end 16 in the form of a lock housing, and an elongated steel rod 18 axially slidably received in housing 12 and having an inner end, not shown, which is displaceable toward and away from inner end 14 of the housing. Attachment components in the form of hooks 22 and 24 are provided respectively on housing 12 and rod 18 and are adapted to engage diametrically opposed portions of a vehicle steering wheel SW from the inside thereof when the device is installed on the steering wheel. In the embodiment illustrated, rod 18 is provided with annular notches 26 along the length thereof which cooperate with a key operated latch component, not shown, in lock housing 16 to axially hold rod 18 in an adjusted position thereof relative to housing 12. The latch component is part of a locking mechanism, not illustrated, which includes a key operated tumbler 28 by which the latch is actuated to lock and release rod 18. When rod 18 is unlocked through key operated tumbler 28, the rod is displaceable into housing 12 from the position shown in FIG. 1 whereupon hook 24 is displaced toward hook 22 to enable release of the steering wheel lock from the steering wheel. It will be appreciated, therefore, that attachment components 22 and 24 of the anti-theft device are relatively displaceable between retracted and extended positions relative to one another and which positions respectively correspond to storage and mounted or use positions for the attachment components and thus the anti-theft steering wheel lock.

Figure 2:
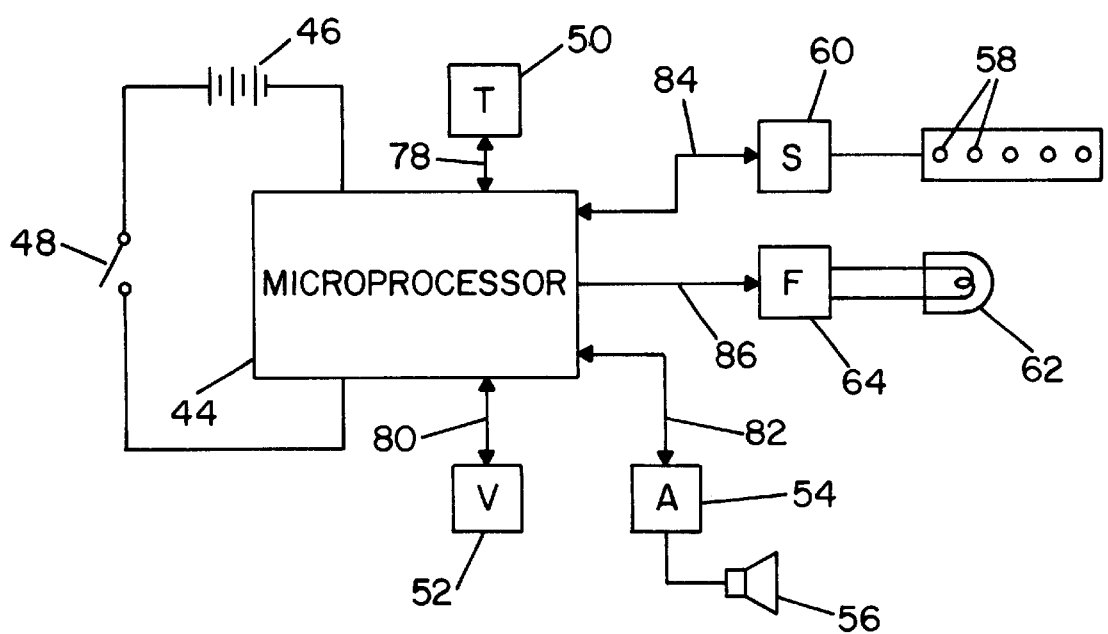
FIG. 2 is a block diagram of the electrical anti-theft device.

Housing 12 is preferably of tubular hardened steel construction and includes an inner portion 30 attached to lock housing 16 for slidably receiving the inner end of rod 18, and an outer portion 32 which is preferably in the form of a tubular sleeve of hardened steel providing outer end 14 of housing 12 and secured to inner portion 30 thereof such as by welding. Sleeve 32 has an outer end 34 and an inner end 36 and provides a chamber 38 which receives and supports an electrical anti-theft device 40 in accordance with the present invention. Anti-theft device 40 includes a circuit board 42 suitably supported in chamber 40 and which circuit board carries the component parts of the electrical circuit of the anti-theft device. As illustrated in FIG. 2 of the drawing, the basic components of the electrical circuit include a microprocessor 44, a battery 46, an arming and disarming switch 48, a timer 50, a vibration sensor 52, an audio signal generator 54 and associated speaker 56, a plurality of light producing elements 58 such as LED's and a light sequencing circuit 60 therefor, a light producing element 62 such as a halogen lamp and a strobe circuit 64 therefor. Battery 46 is preferably replaceable and, for example, may be a long life lithium battery, and arming and disarming switch 48 is preferably key operated. Accordingly, as will be appreciated from FIG. 1, housing sleeve 32 is provided with a tumbler housing 68 for a key operated tumbler 70 by which switch 48 is displaced between arming and disarming positions respectively closing and opening the circuit to microprocessor 44 through battery 46. Speaker 56 is adapted to output an audible alarm signal and can, for example, be a piezoelectric transducer for producing different pitch sounds such as that of a buzzer or a siren. Preferably, speaker 56 is mounted on the circuit board so as to face radially outwardly of housing sleeve 32, and the latter is preferably provided with a plurality of apertures 72 therethrough to preclude muffling of the audible signal. LED's 58 are preferably mounted on board 40 so as to face radially outwardly of housing sleeve 32, and the latter is provided with openings 74 through which the LED's can extend and/or be visible when activated. Lamp 62 is preferably mounted on the same end of board 40 so as to face axially outwardly of the outer end 34 of sleeve 32. The lamp can be provided with a reflector therebehind, not shown, and preferably sleeve 32 is provided with an end wall 76 in the form of a transparent plate or lens to optimize the intensity and visibility of the light emitted from lamp 62.

Timer 50, vibration sensor 52, audible signal generator 54, light sequencing circuit 60, and strobe circuit 64 are conventional known types of devices the functions of which are implemented and controlled by microprocessor 44. Timer 50, vibration sensor 52, signal generator 54, light sequencing circuit 60, and strobe circuit 64 are interconnected with microprocessor 44 by way of signal lines 78, 80, 82, 84, and 86, respectively. The, operation of microprocessor 44 is regulated by a control program that is stored in its memory and which control program is illustrated in flow diagram form in FIG. 3 of the drawing. This flow diagram indicates the major functional capabilities of the electrical circuit with respect to the audio signal and tamper indicating signal producing circuits and is a distillation of the essential elements of the program that regulates the operation of the various component parts, the details of which are unnecessary for an understanding of the invention described herein and accordingly are not disclosed herein for the purpose of simplicity.

Figure 3:
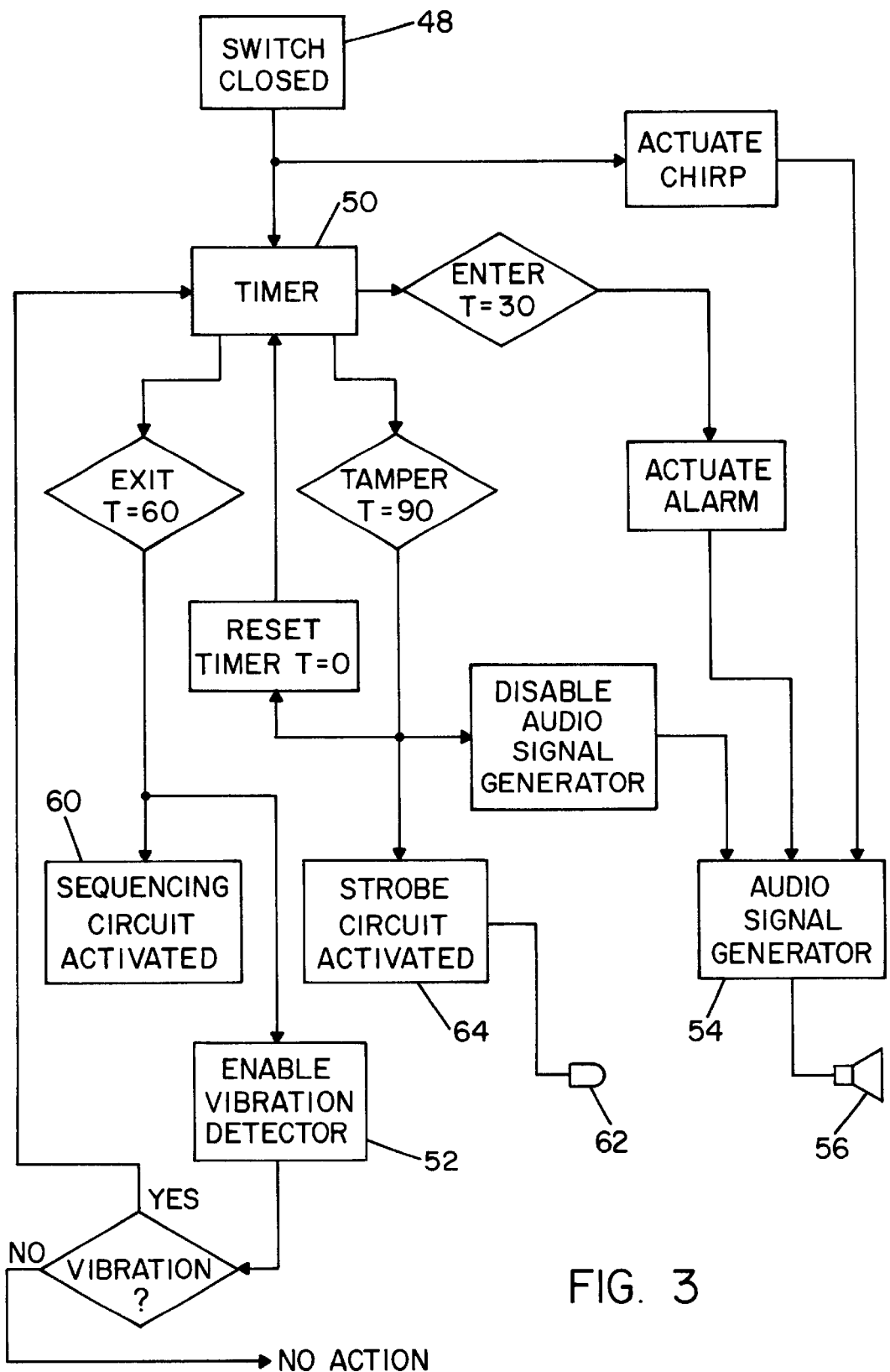
FIG. 3 is a flow diagram for the electrical anti-theft device.

In use of the electrical anti-theft device, it will be appreciated that the mechanical device on which it is mounted in accordance with the preferred embodiment does not have to be mounted on the vehicle steering wheel as shown in FIG. 1. In either event, the vehicle owner or authorized operator closes switch 48 by inserting an appropriate key in tumbler 70 and turning the latter, whereupon microprocessor 44 is activated through battery 46. Referring in particular to FIGS. 2 and 3 of the drawing, it will be appreciated that when microprocessor 44 is so activated, it sends an exit delay start signal to timer 50 through line 78 and a signal through line 82 to signal generator 54 which is converted into an audible "chirp" for indicating activation of the microprocessor and the beginning of the exit delay. Timer 50 provides an exit delay to provide the vehicle operator with sufficient time to exit before the system becomes armed and, in the embodiment illustrated, the exit delay is 60 seconds. At the end of the exit delay, the microprocessor sends an enabling signal through line 80 to vibration sensor 52, and sends an activating signal through line 84 to light sequencing circuit 60 which then operates to continuously sequentially activate LED's 58 to provide a visual indication that the anti-theft device is armed. Presuming first, that there is no tampering with the vehicle prior to the return of the owner thereto, vibration is detected by sensor 52 when the owner reenters the vehicle. Vibration sensor 52 then sends a signal through line 80 to microprocessor 44 in response to which the microprocessor outputs a start signal to timer 50 to provide an entry delay which, in the embodiment illustrated, allows the operator 30 seconds to reenter the vehicle and open switch 48 to disarm the device without activating the alarm. However, it will be appreciated that this delay, while preferred for the owners convenience, is not necessary.

Presuming the vibration referred to above to be caused by an unauthorized person entering or attempting to gain entry to the vehicle, or to otherwise tamper therewith such as by attempting to open the hood or trunk, or to tow the vehicle, the entry delay referred to above is initiated as described. At the end of the 30-second delay, microprocessor 44 outputs a signal via line 82 to audio signal generator 54 and in response to which the latter converts the signal into an audible alarm signal output from speaker 56. At the same time, microprocessor 44 outputs a start signal to timer 50 to provide a duration time for the alarm signal. After a predetermined time duration for the generation of the audible alarm signal, such as 90 seconds, microprocessor 44 outputs a signal through line 86 to activate strobe circuit 64, whereupon the latter circuit operates to output pulses for lamp 62 to flash at a predetermined flash rate. The signal through line 86 to strobe circuit 64 is maintained until such time as the microprocessor is disconnected from power source 46 by opening switch 48. Accordingly, the strobe light flashes continuously once it has been activated. While the activation of the strobe light is preferably contemporaneous with deactivation of the audible alarm signal, it will be appreciated that the strobe light can be activated at any time after tampering is detected and, accordingly, could be activated contemporaneously with activation of the alarm signal. Further, it should be noted at this point that, as mentioned above, the entry delay is not necessary and, in the absence thereof, it will be appreciated that the audible alarm signal and thus, possibly, the strobe light, would be activated without delay when tampering with the vehicle is detected.

At the end of the timed duration for the audible alarm signal, microprocessor 44 outputs a disabling signal through line 82 to audio signal generator 54, whereupon the audible alarm signal from speaker 56 ceases. Microprocessor 44 also outputs a signal through line 78 to timer 50 at this time to reset the timer functions. Accordingly, after the initial time delay of 60 seconds, the microprocessor again outputs a signal via line 80 to enable vibration detector 52 and through line 84 to light sequencing circuit 60, whereupon the anti-theft device is reset and is armed as indicated by the sequencing of LED's 58. Should a second effort to enter or otherwise tamper with the vehicle occur prior to the owner's return thereto, the anti-theft device will again respond to the vibration accompanying such effort to issue the audible alarm in the foregoing manner. During such second operation of the audible alarm, strobe light 62 continues to flash on and off, thereby enhancing the deterrent with respect to the unauthorized person continuing with the tampering effort. At the end of the predetermined duration for the audible alarm signal, the latter is interrupted in the manner described and the strobe light continues to be energized. When the vehicle owner or authorized operator returns, he or she is made aware of the vehicle having been tampered with by seeing the flashing strobe light, whereupon the owner can take appropriate action.

While considerable emphasis has been placed on a preferred embodiment of an electrical anti-theft device for a motor vehicle and a preferred anti-theft system in which the electrical device is incorporated in the handle portion of a mechanical anti-theft device mountable on a vehicle steering wheel, it will be appreciated that other embodiments of the device and system can be made and that many changes can be made in the preferred embodiment without departing from the principles of the invention. In this respect, for example, while it is preferred that the tamper indicator be a strobe light for the warning that the latter gives a vehicle owner in advance to his or her returning to the vehicle, it will be appreciated that other light arrangements as well as arrangements other than lights, such as an intermittent beep, can be provided for indicating that the vehicle has been tampered with. Further, it will be appreciated that the electrical anti-theft system could be added to or incorporated in the electrical system of a vehicle such that the alarm activated by tampering with the vehicle could include the vehicle lights and/or horn. Still further, while it is preferred when the electrical anti-theft device is mounted on a mechanical vehicle steering wheel lock as shown to provide for arming the electrical device through a key operated switch thereon, it will be appreciated that the arming switch could be opened and closed in response to displacement of the inner end of the rod member of the mechanical device inwardly and outwardly between the mounted and stored positions of the attachment hooks such that the electrical device would be armed when the mechanical device is mounted on a steering wheel. It will be further appreciated that the delay times for exiting and reentering the vehicle can be varied from the times given herein as examples as can the duration of the audible alarm signal issued in response to tampering with the vehicle, and that the tamper sensing device can be other than vibration responsive and can be, for example, noise or motion sensing devices and the like. These and other modifications of the preferred embodiment as well as other embodiments of the invention will be suggested and obvious to those skilled in the art, whereby it is to be distinctly understood that the foregoing descriptive matter is to be interpreted merely as illustrative of the invention and not as a limitation.

Having thus described the invention, it is claimed:

1. A vehicle anti-theft device comprising, electrical circuit means including alarm means having activated and deactivated modes, sensing means for sensing tampering with said vehicle, means for shifting said alarm means to said activated mode in response to said sensing means sensing tampering with said vehicle, means including timing means for shifting said alarm means from said activated mode to said deactivated mode after a predetermined period of time, tamper indicating mean separate from said alarm means for indicating tampering with said vehicle, and means for activating said tamper indicating means in response to said sensing means sensing tampering with said vehicle wherein said timing means includes means for activating said tamper indicating means after the expiration of said period of time.

2. An anti-theft device according to claim 1, wherein said tamper indicating means includes visible indicating means.

3. An anti-theft device according to claim 2, wherein said visible indicating means includes light producing means.

4. An anti-theft device according to claim 3, wherein said light producing means includes strobe light means.

5. An anti-theft device according to claim 1, wherein said alarm means includes an audible alarm.

6. An anti-theft device according to claim 1, wherein said sensing means includes vibration detecting means.

7. An anti-theft device according to claim 1, wherein said electric circuit means has armed and disarmed conditions, and switch means for closing and opening said circuit to respectively provide said armed and disarmed conditions.

8. An anti-theft device according to claim 7, wherein said switch means is key operated.

9. An anti-theft device according to claim 7, wherein said electrical circuit means includes light means for indicating said armed condition.

10. An anti-theft device according to claim 9, wherein said light means for indicating said armed condition includes a plurality of light producing elements and means for continuously sequentially activating said light producing elements.

11. An anti-theft device according to claim 1, wherein said alarm means includes an audible alarm and said tamper indicating means includes visible indicating means.

12. An anti-theft device according to claim 11, wherein said electric circuit means has armed and disarmed conditions and includes light means for indicating said armed condition.

13. An anti-theft device according to claim 12, wherein said sensing means includes vibration detecting means.

14. An anti-theft device according to claim 13, wherein said tamper indicating means includes a strobe light.

15. An anti-theft device according to claim 14, wherein said light means for indicating said armed condition includes a plurality of light producing elements and means for continuously sequentially activating said light producing elements.

16. An anti-theft device according to claim 15, wherein said electrical circuit means includes switch means having closed and open positions respectively providing said armed and disarmed conditions.

17. An anti-theft device according to claim 16, wherein said timing means includes means for activating said tamper indicating means after the expiration of said period of time.

18. An anti-theft device according to claim 17, wherein said switch means is key operated.

19. A vehicle anti-theft system comprising an anti-theft device mountable in a vehicle to limit rotation of a vehicle steering wheel, an alarm device mounted on said anti-theft device and including electrical circuit means, said circuit means having armed and disarmed conditions, means for shifting said circuit means between said armed and disarmed conditions, alarm means in said circuit means, said alarm means in said armed condition having activated and deactivated modes, said circuit means including sensing means for sensing tampering with said vehicle, means for shifting said audible alarm to said activated mode in response to said sensing means sensing tampering with said vehicle, means including timing means for shifting said alarm means from said activated mode to said deactivated mode after a predetermined period of time, signal means separate from said alarm means for indicating tampering with said vehicle, and means for activating said signal means in response to said sensing means sensing tampering with said vehicle wherein said timing means includes means for activating said signal means after expiration of said period of time.

20. An anti-theft system according to claim 19, wherein said anti-theft device includes first and second attachment means displaceable relative to one another between mounting and storage positions, and key operated lock means for releasably locking said first and second attachment means in said mounting position against relative displacement toward said storage position.

21. An anti-theft system according to claim 20, wherein said anti-theft device comprises tubular housing means having opposite ends and supporting said first attachment means, said second attachment means including rod means slidably received in one of said opposite ends and having an inner end displaceable toward and away from the other of said opposite ends, said alarm device being in said housing means between said other of said opposite ends thereof and said inner end of said rod.

22. An anti-theft system according to claim 21, wherein said means for shifting said circuit means between said armed and disarmed conditions includes switch means on said housing means.

23. An anti-theft system according to claim 22, wherein said switch means is key operated.

24. An anti-theft system according to claim 19, wherein said means for shifting said circuit means between said armed and disarmed conditions includes switch means.

25. An anti-theft system according to claim 19, and means for visually indicating said armed condition of said circuit means.

26. An anti-theft system according to claim 25, wherein said means for visually indicating said armed condition includes at least one intermittently activated light producing element.

27. An anti-theft system according to claim 25, wherein said means for visually indicating said armed condition includes a plurality of continuously sequentially activated light producing elements.

28. An anti-theft device according to claim 19, wherein said sensing means includes vibration detecting means.

29. An anti-theft device according to claim 19, wherein said alarm means includes an audible alarm.

30. An anti-theft device according to claim 19, wherein said signal means includes an intermittently activated light.

31. An anti-theft device according to claim 30, wherein said light is a strobe light.

* * * * *